US012541344B2

(12) United States Patent
Terada

(10) Patent No.: US 12,541,344 B2
(45) Date of Patent: Feb. 3, 2026

(54) RECORDING MEDIUM, PROGRAMMING ASSISTING DEVICE, AND PROGRAMMING ASSISTING METHOD

(71) Applicant: Mitsubishi Electric Corporation, Tokyo (JP)

(72) Inventor: Keitaro Terada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/878,664

(22) PCT Filed: Dec. 8, 2022

(86) PCT No.: PCT/JP2022/045374
§ 371 (c)(1),
(2) Date: Dec. 24, 2024

(87) PCT Pub. No.: WO2024/122038
PCT Pub. Date: Jun. 13, 2024

(65) Prior Publication Data
US 2025/0173128 A1 May 29, 2025

(51) Int. Cl.
*G06F 8/33* (2018.01)
(52) U.S. Cl.
CPC .................... *G06F 8/33* (2013.01)
(58) Field of Classification Search
CPC ........................................ G06F 8/33
See application file for complete search history.

(56) References Cited

U.S. PATENT DOCUMENTS 7,117,043 B1 * 10/2006 Frederick ............. G05B 19/056
715/255
2006/0253838 A1 * 11/2006 Fujii ................... G06F 9/44505
717/124

(Continued)

FOREIGN PATENT DOCUMENTS

JP         S60-221847 A    11/1985
JP         2002-099742 A    4/2002

(Continued)

OTHER PUBLICATIONS

Giamblanco, Nicholas V. "Dynamic Memory Allocation Techniques for High-Level Synthesis," 2020 [retrieved Sep. 7, 2025], pp. 1-90, downloaded from <url>:https://https://utoronto.scholaris.ca/server/api/core/bitstreams/16a40d9b-4f17-46df-a6a9-29be06d04245/content. (Year: 2020).*

(Continued)

*Primary Examiner* — S. Sough
*Assistant Examiner* — Stephen D Berman
(74) *Attorney, Agent, or Firm* — XSENSUS LLP

(57) ABSTRACT

A programming assisting program causes a computer to function as a calculator that acquires, from a database storing information indicating an address space in a memory having a range pre-allocated to each type of component included in a project performed by a PLC, the information indicating the address space, and allocates components to the address space to calculate a use volume in the memory used by the project for each type of component, a determiner that determines, based on the use volume and an allocated volume in the memory determined based on the pre-allocated range, an allocated volume allocated to each type of component, a changer that changes, based on the determined allocated volume for each type of component, the range pre-allocated to each type of component, and a display that (Continued)

displays, for each type of component, the calculated use volume and the determined allocated volume on a screen.

14 Claims, 18 Drawing Sheets

(56) References Cited

U.S. PATENT DOCUMENTS

| | | | | |
|---|---|---|---|---|
| 2007/0118600 | A1* | 5/2007 | Arora | G06F 11/3447 |
| | | | | 709/206 |
| 2007/0233990 | A1* | 10/2007 | Kuczynski | G06F 16/22 |
| | | | | 711/170 |
| 2015/0331407 | A1* | 11/2015 | Lee | G05B 19/056 |
| | | | | 700/86 |
| 2020/0044938 | A1* | 2/2020 | Dias | G06F 9/5044 |
| 2022/0197809 | A1* | 6/2022 | Eris | G06N 5/01 |
| 2023/0281044 | A1* | 9/2023 | Kutthumolu | G06F 11/3075 |
| | | | | 718/104 |
| 2024/0160565 | A1* | 5/2024 | Ju | G06F 12/0292 |

FOREIGN PATENT DOCUMENTS

| | | |
|---|---|---|
| JP | 2016-081300 A | 5/2016 |
| JP | 2019-021955 A | 2/2019 |

OTHER PUBLICATIONS

Haikun Liu et al., "Hotplug or Ballooning: A Comparative Study on Dynamic Memory Management Techniques for Virtual Machines," Apr. 29, 2014 [retrieved Sep. 7, 25], pp. 1350-1363, downloaded from <url>:https://ieeexplore.ieee.org/stamp/stamp.jsp?tp=&arnumber= 6807799. (Year: 2014).*

International Search Report and Written Opinion mailed on Feb. 14, 2023, received for PCT Application PCT/JP2022/045374, filed on Dec. 8, 2022, 8 pages including English Translation.

Notification of Reason for Refusal mailed on Jul. 18, 2023, received for JP Application 2023-523539, 6 pages including English Translation.

Notice of Decision to Grant mailed on Nov. 28, 2023, received for JP Application 2023-523539, 5 pages including English Translation.

* cited by examiner

FIG. 8

Model selection result

Use volume for project X: 110K words

| Model name | Memory volume | SRAM expandability |
|---|---|---|
| R00CPU | 126K words | Not expandable |
| R01CPU | 126K words | Not expandable |
| R02CPU | 126K words | Not expandable |
| R04CPU | 200K words | Expandable |

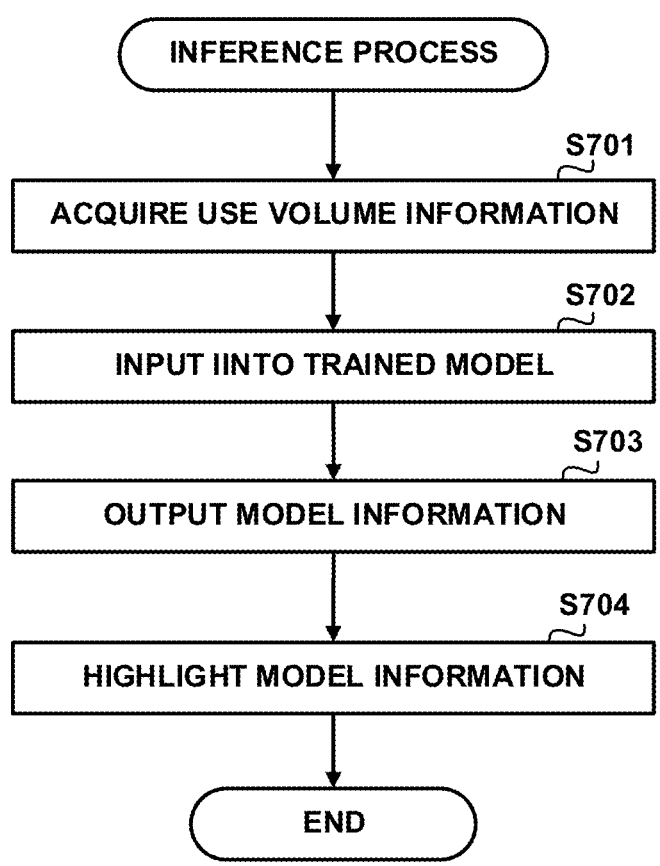

RECORDING MEDIUM, PROGRAMMING ASSISTING DEVICE, AND PROGRAMMING ASSISTING METHOD

CROSS-REFERENCE TO RELATED APPLICATION

This application is a national stage application, pursuant to 35 U.S.C. § 371, of International Patent Application No. PCT/JP2022/045374, filed Dec. 8, 2022, the entire contents of which are incorporated herein by reference.

TECHNICAL FIELD

The present disclosure relates to a programming assisting program, a programming assisting device, and a programming assisting method.

BACKGROUND ART

Programming of a project performed by a programmable logic controller (PLC) uses a known technique for presenting, to a user, a use volume in a memory of the PLC used by the project. For example, Patent Literature 1 describes a technique for transmitting a query to the PLC to acquire the size of volume used by the project area for storing the project data and the size of volume used by the user area for storing the user data such as a logging file or a PLC user manual, and displaying the acquired size of each use volume on a screen.

CITATION LIST

Patent Literature

Patent Literature 1: Unexamined Japanese Patent Application Publication No. 2016-081300

SUMMARY OF INVENTION

Technical Problem

With the above technique, when an allocated volume in the memory with respect to the project is to be changed, or when, for example, a use volume in the memory used by a type of component included in the project is larger than the allocated volume allocated to the corresponding type of component, the user needs to manually change the allocated volume based on the displayed use volume.

Under such circumstances, an objective of the present disclosure is to provide a programming assisting program, a programming assisting device, and a programming assisting method capable of automatically changing the allocated volume in the memory allocated to each type of component included in the project performed by the PLC.

Solution to Problem

To achieve the above objective, a programming assisting program according to an aspect of the present disclosure causes a computer to function as calculation means for acquiring, from a database storing information indicating an address space in a memory having a range pre-allocated to each type of component included in a project performed by a programmable logic controller, the information indicating the address space, and allocating components included in the project to the address space indicated by the acquired information to calculate a use volume in the memory used by the project for each type of component, determination means for determining, based on the use volume calculated for each type of component and an allocated volume in the memory determined based on the range pre-allocated to each type of component, an allocated volume in the memory allocated to each type of component in the project, changing means for changing, based on the allocated volume for each type of component determined by the determination means, the range pre-allocated to each type of component relating to the information indicating the address space stored in the database, and display means for displaying, for each type of component, the use volume calculated by the calculation means and the allocated volume determined by the determination means on a screen.

Advantageous Effects of Invention

The technique according to the above aspect of the present disclosure can provide a programming assisting program, a programming assisting device, and a programming assisting method capable of automatically changing the allocated volume in the memory allocated to each type of component included in the project performed by the programmable logic controller.

BRIEF DESCRIPTION OF DRAWINGS

FIG. 8 is a diagram of a display example of a model selection result in Embodiment 1;

FIG. 18 is a flowchart of an inference process performed by the inference device in Embodiment 2.

DESCRIPTION OF EMBODIMENTS

Embodiment 1

Figure 1:
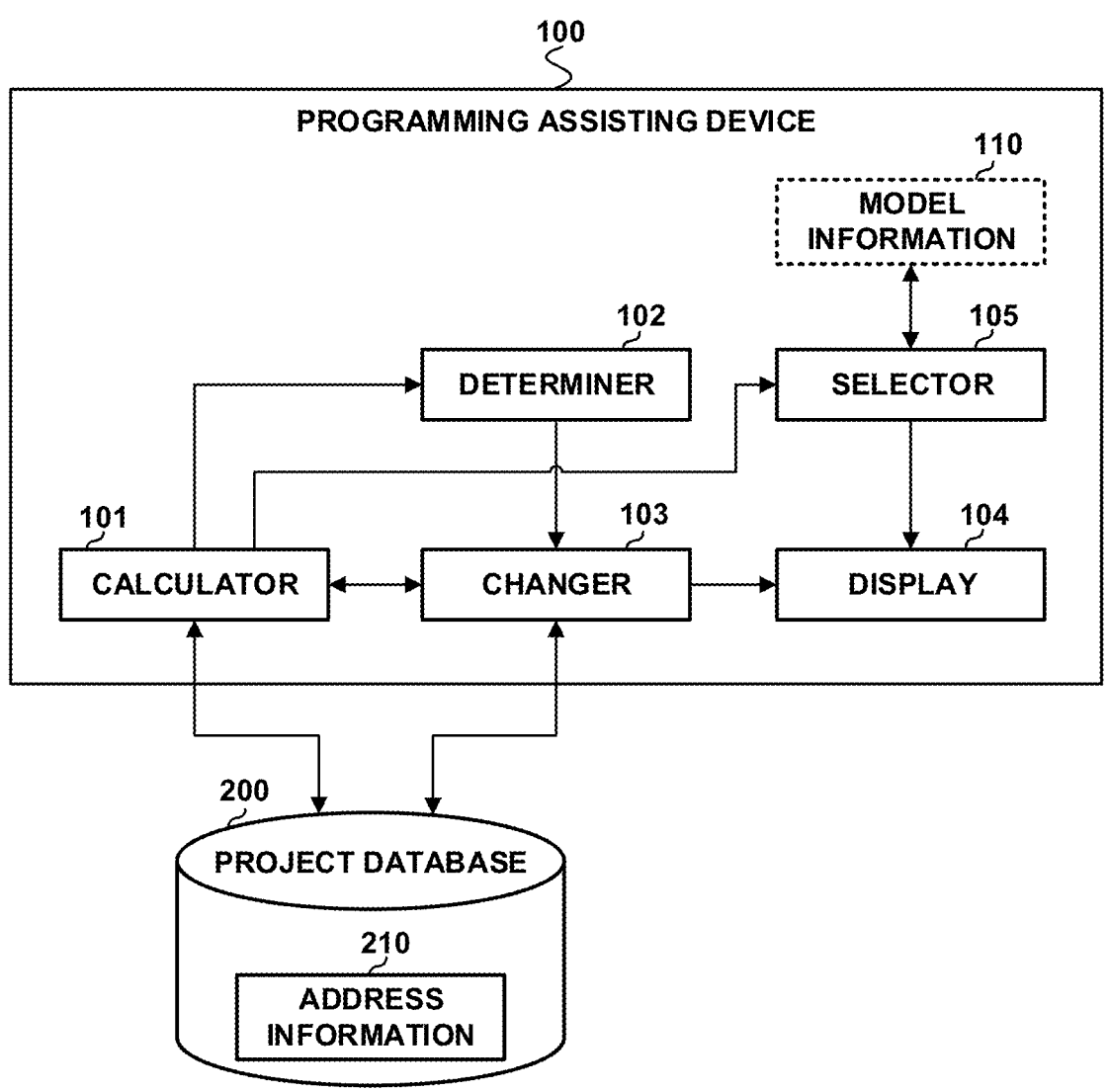
FIG. 1 is a diagram of a programming assisting device according to Embodiment 1, illustrating the functional components.

A programming assisting device 100 according to Embodiment 1 assists in programming of a project performed by a programmable logic controller (PLC). For example, the programming assisting device 100 serves as a programming assisting tool. As illustrated in FIG. 1, the programming assisting device 100 is connected to a project database 200 for mutual communication.

The project database 200 stores information about the project performed by the PLC. The information about the project is a data group of information about the project generated by the programming assisting device 100. The information about the project includes address information 210. The address information 210 is information that indicates an address space in a memory of the PLC. The address space has a range pre-allocated to each type of component included in the project. Examples of types of components included in the project include programs, function blocks (FBs), structures, labels, and devices. More specifically, the range of an address space is pre-defined for each of such programs, FBs, structures, labels, and devices. Thus, the allocated volume in the memory allocated to each type of such components is pre-defined. The project database 200 is an example of a database.

When a user creates a project, the programming assisting device 100 performs an allocation process for allocating each component included in the project to an address space at any predetermined timing. When the allocation process has been performed, allocation information indicating the address of the address space in a manner associated with the component included in the project is stored as the address information 210. In some project created by the user, the use volume in the memory for each type of component included in the project may be larger than the allocated volume in the memory pre-allocated to the corresponding type of component. In this case, the programming assisting device 100 automatically adjusts the allocated volume.

Figure 2:
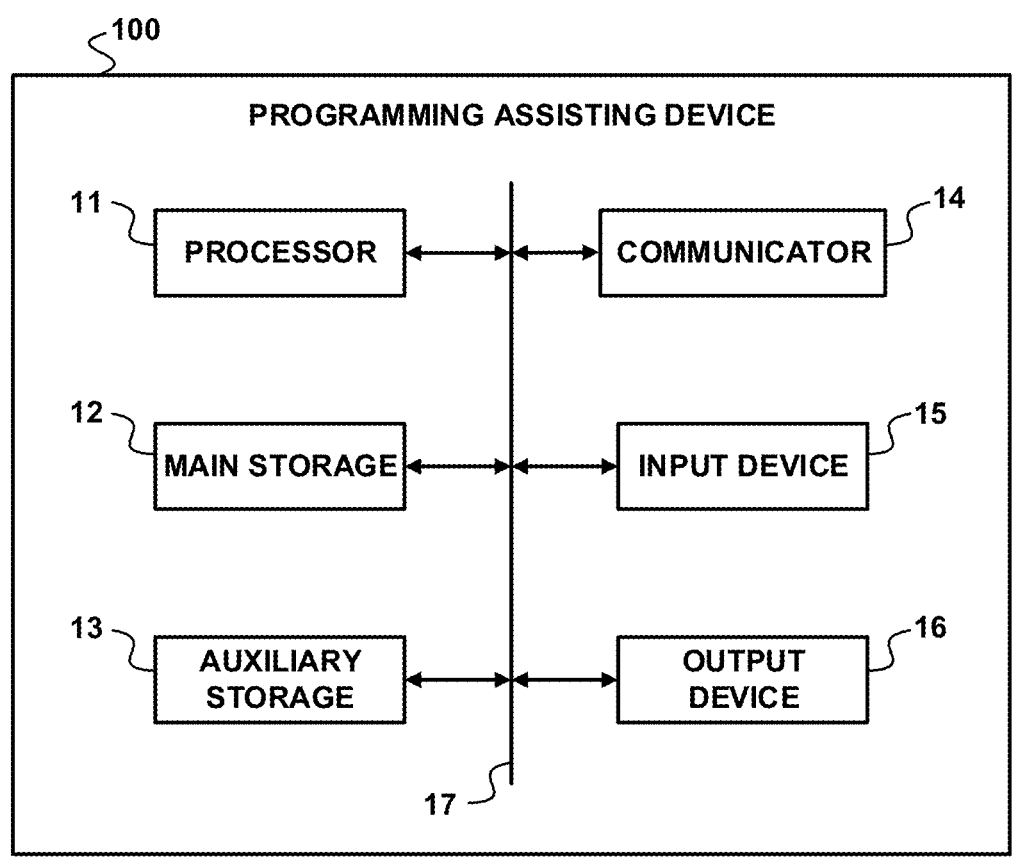
FIG. 2 is a block diagram of the programming assisting device according to Embodiment 1, illustrating the hardware configuration.

The programming assisting device 100 in FIG. 1 has the hardware configuration illustrated in FIG. 2.

The programming assisting device 100 includes a processor 11 that performs various processes, a main storage 12 used as a work area for the processor 11, an auxiliary storage 13 that stores various sets of data used for processing performed by the processor 11, a communicator 14 that communicates with an external device, an input device 15 that acquires input information, and an output device 16 that presents various sets of information. The main storage 12, the auxiliary storage 13, the communicator 14, the input device 15, and the output device 16 are all connected to the processor 11 with a bus 17.

The processor 11 includes a central processing unit (CPU). The processor 11 implements various functions of the programming assisting device 100 by executing programs stored in the auxiliary storage 13.

The main storage 12 includes a random-access memory (RAM). The programs are loaded from the auxiliary storage 13 into the main storage 12. The main storage 12 is used as a work area for the processor 11.

The auxiliary storage 13 includes a nonvolatile memory, such as an electrically erasable programmable read-only memory (EEPROM). The auxiliary storage 13 stores, in addition to the programs, various data items used for processing performed by the processor 11. The auxiliary storage 13 provides, as instructed by the processor 11, data to be used by the processor 11 to the processor 11 and stores data provided by the processor 11.

The communicator 14 includes a network interface circuit for communicating with an external device. The communicator 14 receives a signal from the external device and outputs data represented by the signal to the processor 11. The communicator 14 also transmits a signal representing data output from the processor 11 to the external device.

The input device 15 includes input devices such as input keys and a pointing device. The input device 15 acquires information input by the user of the programming assisting device 100 and provides the acquired information to the processor 11.

The output device 16 includes output devices such as a liquid crystal display (LCD) and a speaker. The output device 16 may include a touchscreen integral with the pointing device included in the input device 15. The output device 16 presents various items of information to the user as instructed by the processor 11.

The functions of the programming assisting device 100 are described below with reference to FIG. 1. The programming assisting device 100 includes, as functional components, a calculator 101 that calculates the use volume in the memory used by the project, a determiner 102 that determines allocated volume in the memory, a changer 103 that changes the allocated volume pre-allocated to each type of component, a display 104 that displays the use volume and the allocated volume on a screen, and a selector 105 that selects the model name of the PLC appropriate for performing the project.

The calculator 101 in FIG. 1 acquires, from the project database 200 storing information indicating the address space in the memory having the range pre-allocated to each type of component included in the project performed by the PLC, the information indicating the address space, and allocates components included in the project to the address space indicated by the acquired information to calculate the use volume in the memory used by the project for each type of component. The calculator 101 is implemented by the processor 11 and the communicator 14. The calculator 101 is an example of calculation means.

When, for example, the user creates a project X, the calculator 101 acquires the address information 210 from the project database 200 and allocates the components included in the project X to the address space indicated by the address information 210. The calculator 101 then determines the use volume in the memory used by the components and by each type of component based on the result of the allocation. For example, the calculator 101 determines the use volume as "110K words" for the program, "50K words" for the FB, "40K words" for the structure, "39K words" for the label, and "20K words" for the device.

The display 104 displays, for each type of component, the use volume calculated by the calculator 101 on the screen. The display 104 also displays the use volume used by the components included in the project. The display 104 is implemented by the processor 11 and the output device 16. The display 104 is an example of display means.

Figure 3:
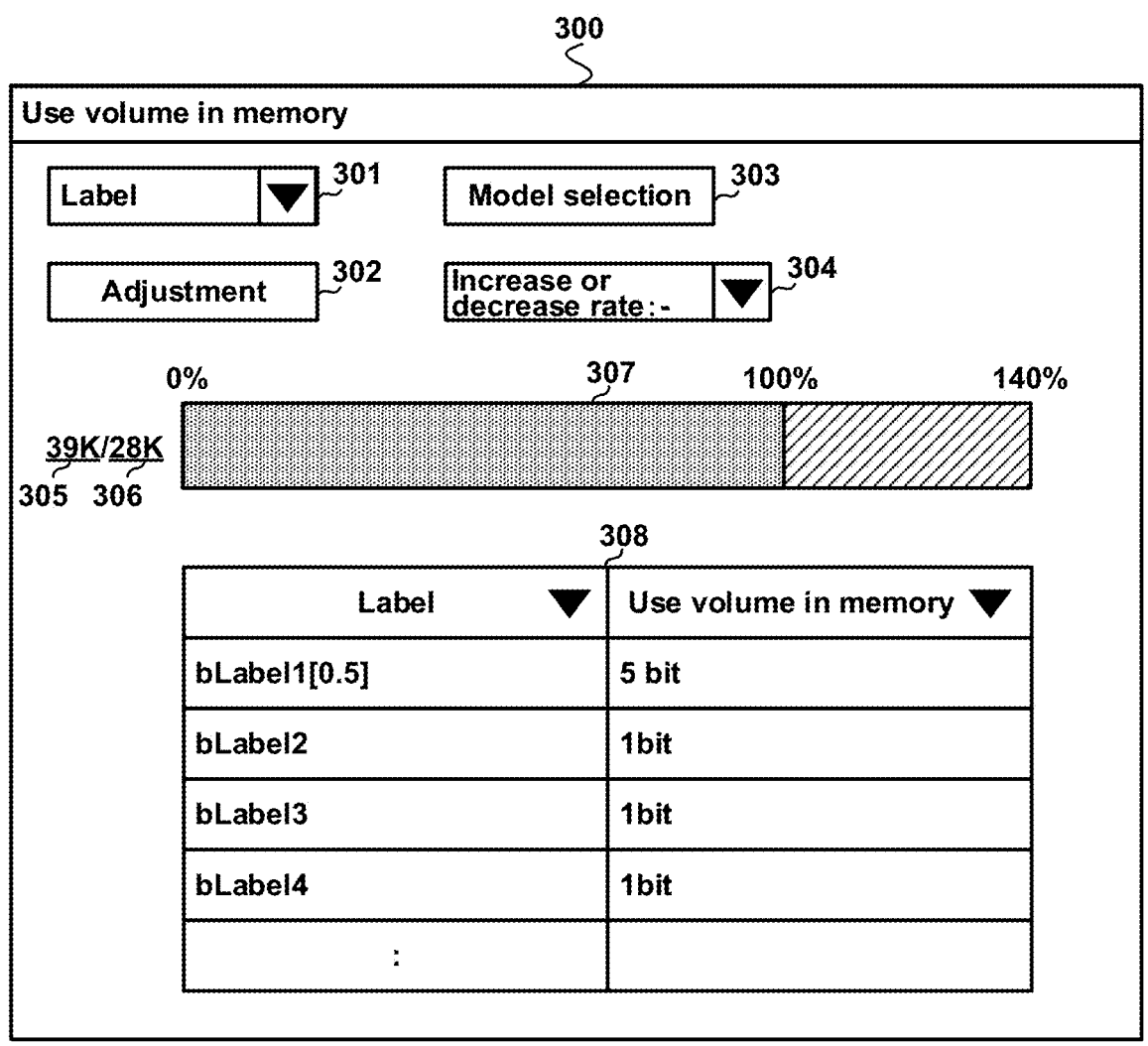
FIG. 3 is a diagram of a display example of a use volume in a memory used by a label in Embodiment 1.

For example, the display 104 displays a window 300 illustrated in FIG. 3 on the screen. The window 300 includes a field 301 for specifying the type of component, a button 302 for adjusting the allocated volume allocated to the type of component, a button 303 for selecting and displaying the model name of the PLC appropriate for performing the project created by the user, a field 304 for specifying the increase or decrease rate of an available volume to the allocated volume, a value 305 indicating the use volume, a value 306 indicating the allocated volume, a bar graph 307 indicating the rate of the use volume to the allocated volume, and a table 308 indicating the use volume for each type of component. Upon selection of the pull-down button in the field 301, the types of the components included in the project are displayed as options. Upon selection of the pull-down button in the field 304, the increase or decrease rate, such as increase rate of "10%", an increase rate of "20%", an increase rate of "30%", . . . , or a decrease rate of "10%", a decrease rate of "20%", a decrease rate of "30%", . . . , are displayed as options.

The window 300 in FIG. 3 appears on the screen when the "label" is specified as the type of component in the field 301. In the field 304 in FIG. 3, the increase or decrease rate is not specified. The value 305 indicating the use volume in the memory for the label in the project X indicates "39K words", and the value 306 indicating the allocated volume in the memory for the label indicates "28K words". The bar graph 307 thus indicates that the use volume is larger than the allocated volume. The table 308 indicates the use volume in the memory used by each label included in the project X. When the button 302 is selected in the window 300 in FIG. 3, the determiner 102 performs an adjustment process for adjusting the allocated volume.

The determiner 102 determines the allocated volume in the memory allocated to each type of component included in the project based on the use volume calculated for each type of component and the allocated volume in the memory determined based on the range pre-allocated to each type of component. The determiner 102 is implemented by the processor 11. The determiner 102 is an example of determination means.

For example, the determiner 102 determines whether there exists a type of component that has the use volume larger than the allocated volume pre-allocated. When determining that there exists a type of component that has the use volume larger than the allocated volume pre-allocated, the determiner 102 determines whether there exists any other type of component that has the use volume smaller than the allocated volume pre-allocated, more specifically, whether there exists any other type of component that has an available volume in the allocated volume. When there is no other type of component that has available volume, the determiner 102 ends the adjustment process. When there exists another type of component that has an available volume, the determiner 102 decreases the allocated volume for the other type of component, and uses the decreased allocated volume to increase the allocated volume for the type of component having the use volume larger than the allocated volume. When all types of components each have the use volume no larger than the allocated volume, the determiner 102 ends the adjustment process.

When, for example, the determiner 102 determines that the label has the allocated volume of "28K words" pre-allocated and the device has the allocated volume of "35K words" pre-allocated, the allocated volume of "28K words" pre-allocated is "11K words" smaller than the use volume of "39K words" for the label, and the allocated volume of "35K words" pre-allocated is "15K words" larger than the use volume of 20K words for the device. Thus, the determiner 102 determines that the allocated volume for the label is "39K words" that is acquired by increasing "11K words" from "28K words" and that the allocated volume for the device is "24K words" that is acquired by decreasing "11K words" from "35K words".

Figure 4:
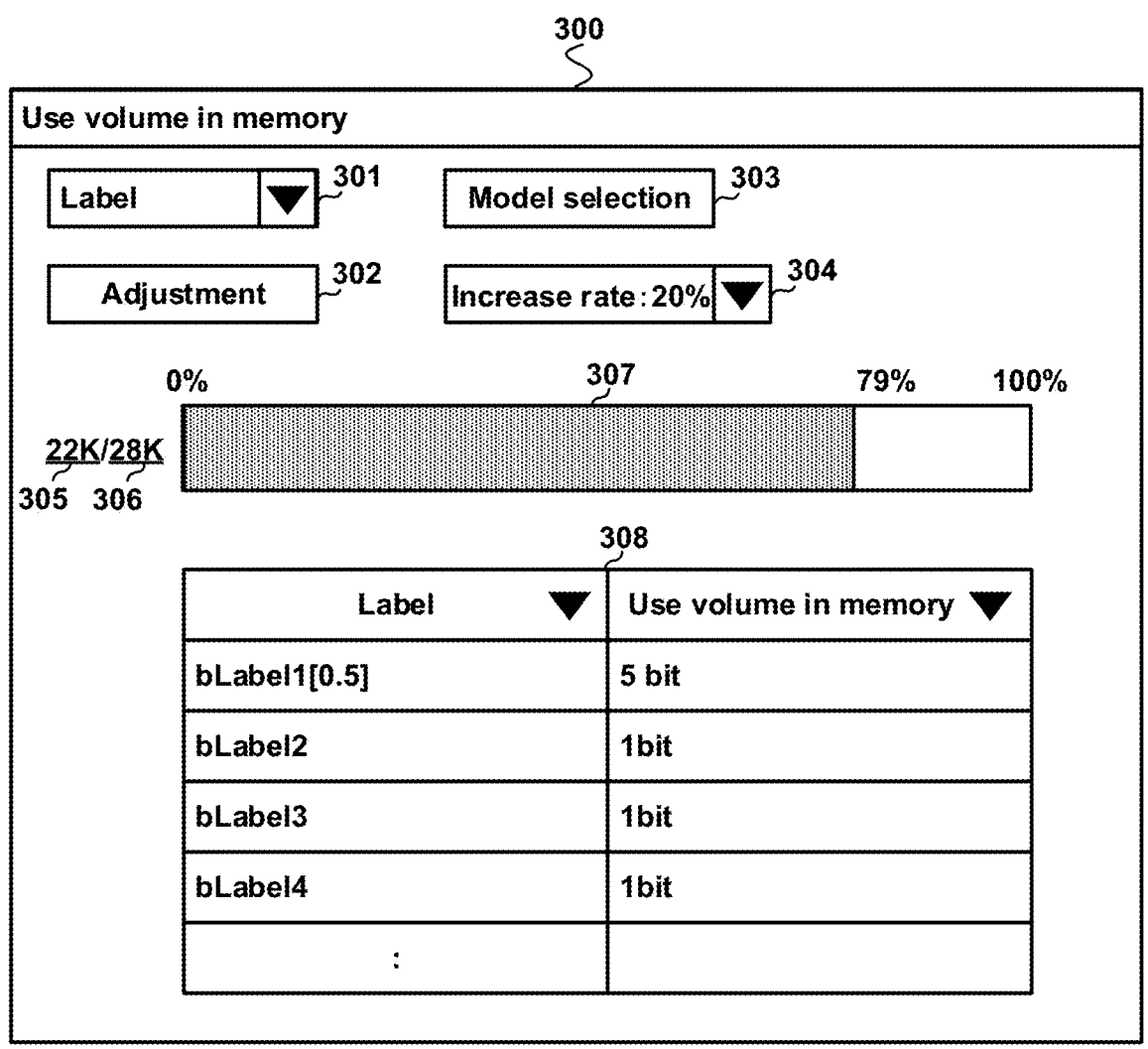
FIG. 4 is a diagram of a display example of the use volume in the memory used by the label in Embodiment 1.

As illustrated in FIG. 4, when the increase rate is specified in the field 304, the process described below is performed. When the increase rate is specified, the determiner 102 sets a first specified value. The first specified value is the sum of the value of the rate of the available volume to the allocated volume and the value of the specified increase rate. For the increase rate in FIG. 4, for example, the first specified value of "41%" is the sum of "21%" as the rate of the available volume to the allocated volume and "20%" as the increase rate. The determiner 102 determines whether the "label" as the type of component specified in the field 301 has the available volume smaller than the first specified value. When determining that the "label" as the type of component specified in the field 301 does not have the available volume smaller than the first specified value, the determiner 102 determines whether there exists any other type of component that has an available volume. When determining that there is no other type of component that has available volume, the determiner 102 ends the increase process. When determining that there exists another type of component has an available volume, the determiner 102 decreases the allocated volume for the other type of component and uses the decreased allocated volume to increase the allocated volume for the type of component having the specified increase rate. When the available volume in the allocated volume for the type of component having the specified increase rate reaches the first specified value or greater, the determiner 102 ends the increase process.

When a decrease rate is specified in the field 304, the process described below is performed. When the decrease rate is specified, the determiner 102 sets a second specified value. The second specified value corresponds to a difference between the value of the rate of the available volume to the allocated volume and the value of the specified decrease rate. For the "label" as the type of component, when, for example, the decrease rate is specified as "20%", the second specified value is "1%" that is a difference between "21%" as the rate of the available volume to the allocated volume and "20%" as the decrease rate. The second specified value smaller than zero indicates that the allocated volume is not sufficient for the use volume and thus the available volume cannot be decreased. The determiner 102 determines whether the allocated volume can be decreased by the specified decrease rate, more specifically, whether the second specified value is greater larger than or equal to zero. When the second specified value is greater than or equal to zero, the determiner 102 decreases the allocated volume for the specified type of component until the available volume reaches 1%. When the second specified value is less than zero, the determiner 102 ends the decrease process. When the allocated volume for the specified type of component has decreased by the specified decrease rate, the determiner 102 uses the decreased allocated volume to increase the allocated volume for, for example, another type of component having the smallest available volume. The determiner 102 may use the decreased allocated volume to increase the allocated volume for another type of component specified by the user.

The changer 103 changes, based on the allocated volume for each type of component determined by the determiner 102, the range pre-allocated to each type of component relating to the information indicating the address space stored in the project database 200. The changer 103 is implemented by the processor 11 and the communicator 14. The changer 103 is an example of changing means.

When, for example, the button 302 is selected in FIG. 3 and the determiner 102 performs the adjustment process, the changer 103 changes the range of the address space for the "label" and the range of the address space for the "device", each stored in the project database 200, based on the allocated volume of "39K words" for the "label" and the allocated volume of "24K words" for the "device", each determined by the determiner 102. The changer 103 thus changes the allocated volume pre-allocated to each type of component to the allocated volume determined by the determiner 102.

The display 104 displays the allocated volume determined by the determiner 102 on the screen.

Figure 5:
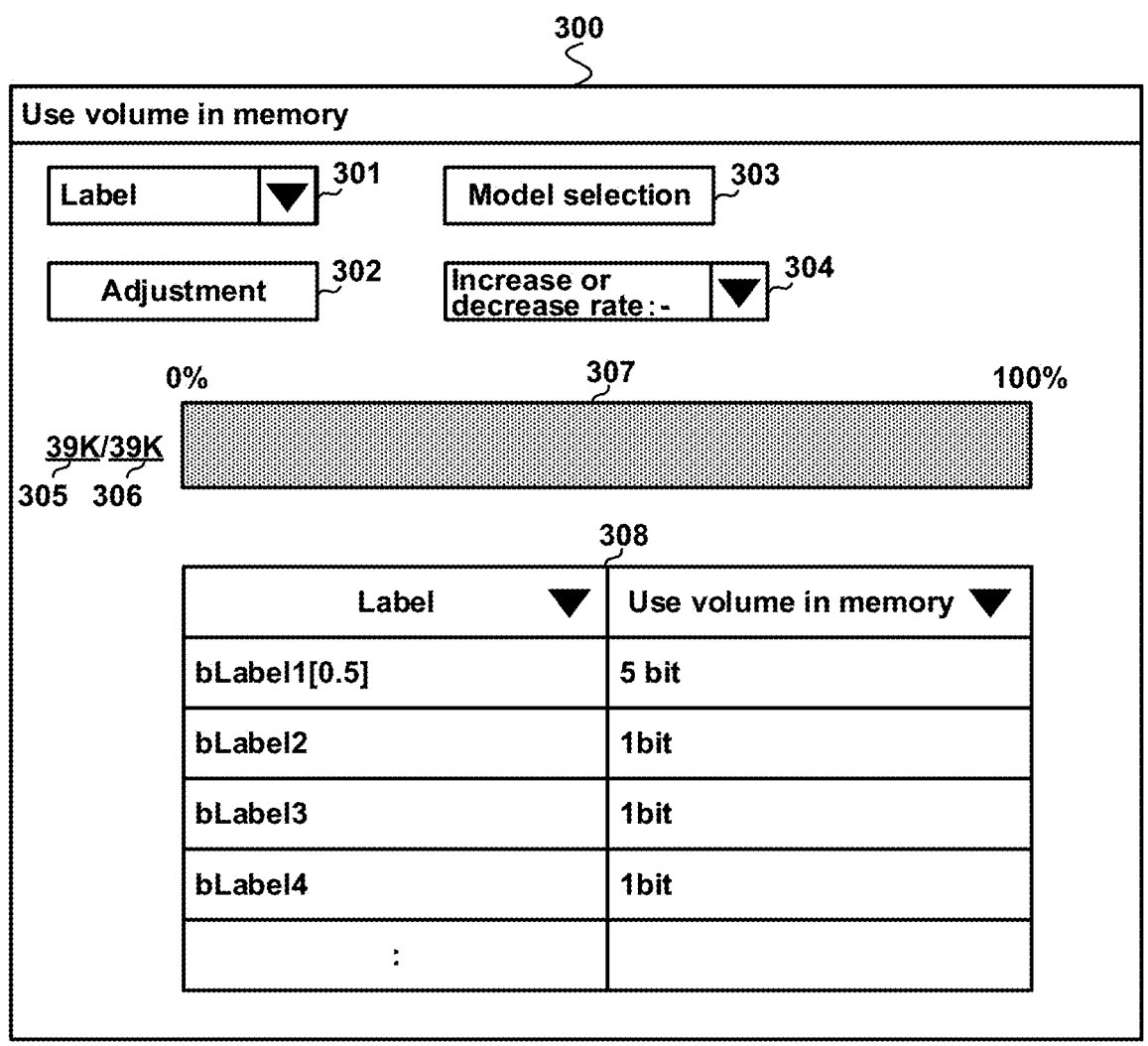
FIG. 5 is a diagram of a display example of the use volume in the memory used by the label in Embodiment 1.

For example, as illustrated in FIG. 5, the display 104 displays the value 306 indicating the allocated volume determined by the determiner 102 for the "label", and updates the display of the bar graph 307 based on the allocated volume determined by the determiner 102.

The display 104 also displays the accessory information describing the components.

The accessory information describes the components, and is provided by the user creating the project or automatically provided. For example, the accessory information about the label is a comment for describing the label. The accessory information about the device is a device number and a comment for describing the device. The accessory information about the FB is a comment for describing the FB instance. The accessory information about the structure is a comment for describing data inside the structure. The accessory information about the program is a program comment for describing the program.

Figure 6:
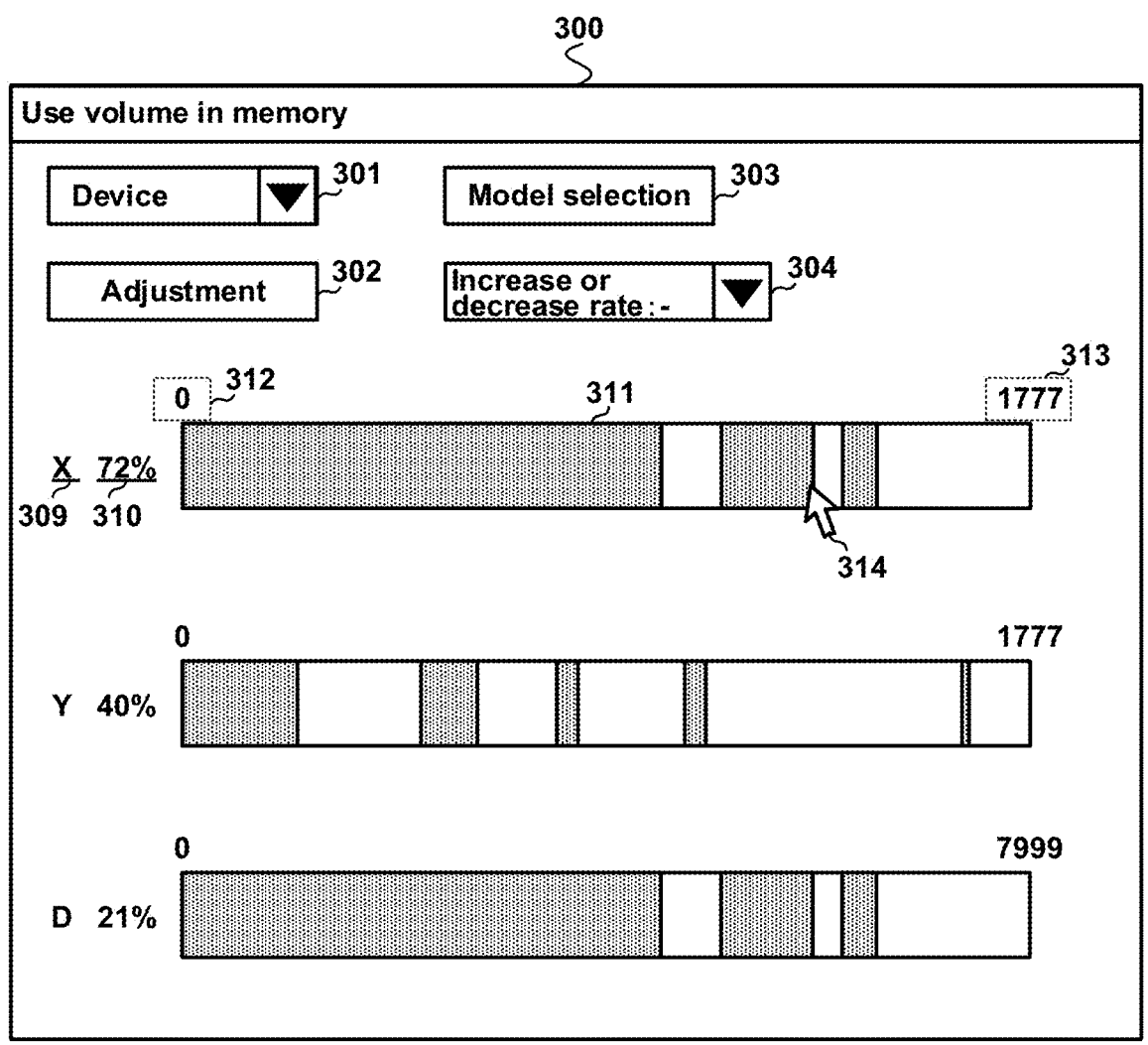
FIG. 6 is a diagram of a display example of a use volume in the memory used by a device in Embodiment 1.

FIG. 6 illustrates the window 300 displayed on the screen by the display 104 when the device is specified as the type of component in the field 301. In the window 300 in FIG. 6, similarly to the window 300 in FIG. 3, the field 301, the field 304, the button 302, and the button 303 are displayed. The window 300 in FIG. 6 further includes a device name 309, a value 310 indicating the rate of the use volume to the allocated volume, a bar graph 311 indicating the used area in the memory, a lower limit indicator 312, and an upper limit indicator 313. The bar graph 311 can be changed in magnification.

Figure 7:
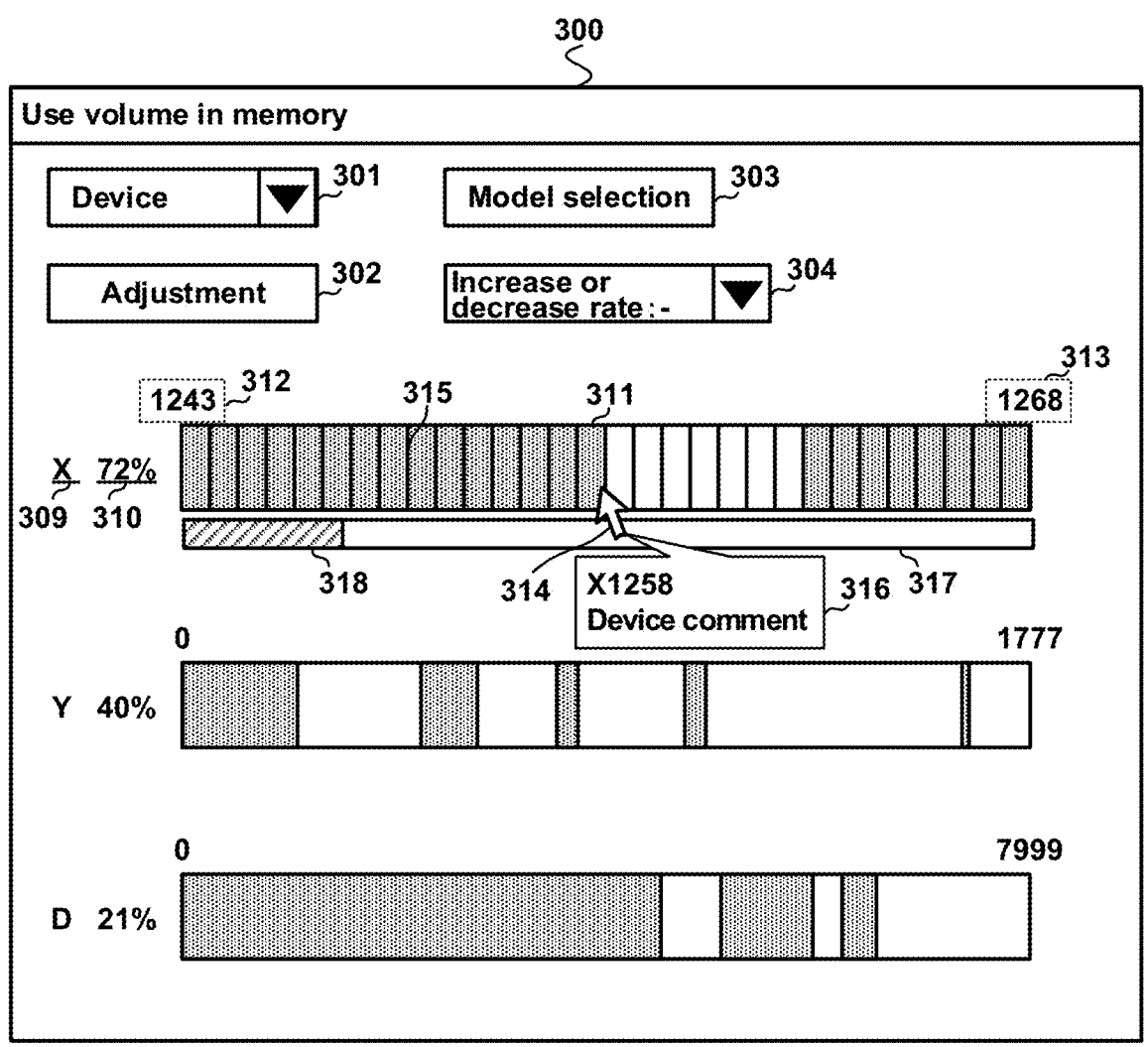
FIG. 7 is a diagram of a display example of the use volume in the memory used by the device in Embodiment 1.

For example, with a specific part of the bar graph 311 indicated by a pointer 314 in the window 300 in FIG. 6, the user may perform an operation to enlarge the display of the bar graph 311 by using a mouse, a keyboard, or a touchscreen. The display 104 then displays the window 300 illustrated in FIG. 7 on the screen. In the window 300 in FIG. 7, values indicated by the lower limit indicator 312 and the upper limit indicator 313 are changed, and a gradation line 315 for each set of data is displayed in the bar graph 311. The graduation lines 315 are displayed or not displayed based on the degree of the reduction rate. When the graduation lines 315 are displayed and the pointer 314 is placed on the bar graph 311, the display 104 displays accessory information 316 about the data on which the pointer 314 is placed. When the bar graph 311 is displayed in an enlarged manner, the display 104 displays a scroll bar 317 including a slider 318. When the slider 318 is moved, the display 104 changes, in response to the movement, the display of the bar graph 311, the lower limit indicator 312, and the upper limit indicator 313.

The selector 105 in FIG. 1 selects, based on the use volume calculated by the calculator 101 and model information 110 including the model names of PLCs and the memory volumes of the PLCs in a manner associated with each other, a model name of the PLC appropriate for performing the project for which the use volume has been calculated. The selector 105 is implemented by the processor 11. The selector 105 is an example of selection means.

The model information 110 is information that includes the model names of PLCs and the memory volumes of the PLCs in a manner associated with each other. The model information 110 further includes information indicating whether a static random-access memory (SRAM) is expandable. The model information 110 is stored in the auxiliary storage 13 included in the programming assisting device 100.

When, for example, the button 303 is selected in the window 300 in FIG. 3, the selector 105 compares the use volume in the memory for the project X calculated by the calculator 101 with the model information 110 to select the model name of the PLC appropriate for performing the project X. For example, the selector 105 determines a lower cost PLC having the memory volume larger than the use volume in the memory for the project as the PLC appropriate for performing the project X. For example, a PLC having smaller memory volume is less costly, and a PLC for which the SRAM is not expandable is less costly than a PLC for which the SRAM is expandable. When multiple PLCs, each having the memory volume larger than the use volume in the memory for the project, are available, the selector 105 selects a PLC having a smaller memory volume and for which the SRAM is not expandable.

The display 104 then highlights the model information including the model name selected by the selector 105.

For example, as illustrated in a window 400 in FIG. 8, the display 104 displays, on the screen, a table 405 including a use volume 401 in the memory used by the entire project, a model name 402 of each PLC, a memory volume 403 of each PLC, and information 404 indicating whether the SRAM is expandable. The display 104 highlights the model information about the PLCs (first to third rows) selected by the selector 105.

Figure 9:
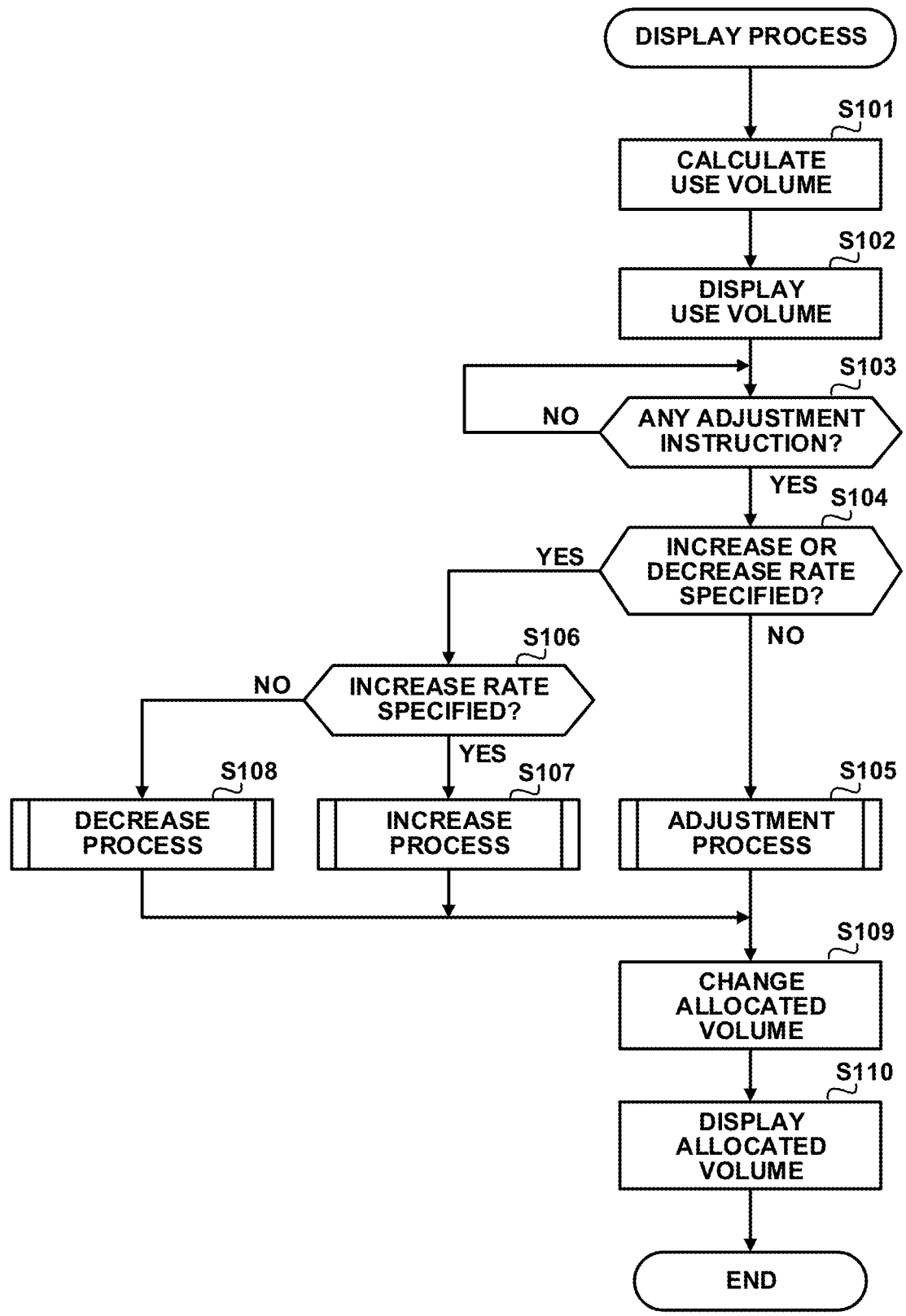
FIG. 9 is a flowchart of a display process in Embodiment 1.

A display process performed by the programming assisting device 100 according to the present embodiment is now described with reference to the flowchart in FIG. 9. Upon receiving, from the user, an operation of displaying the use volume in the memory for the project, the display process in FIG. 9 is performed.

The calculator 101 acquires, from the project database 200 storing information indicating the address space in the memory having the range pre-allocated to each type of component included in the project performed by the PLC, the information indicating the address space, and allocates the components included in the project to the address space indicated by the acquired information to calculate the use volume in the memory used by the project for each type of component (step S101). The display 104 then displays, for each type of component, the use volume calculated by the calculator 101 on the screen (step S102).

For example, the calculator 101 acquires the address information 210 from the project database 200, allocates the components included in the project X to the address space indicated by the address information 210, and determines the use volume in the memory used by the components and by each type of component based on the result of the allocation. As illustrated in FIG. 3, the display 104 then displays, on the screen, the use volume of "39K" words calculated for the "label" as the type of component.

The determiner 102 determines whether the adjustment instruction is received (step S103). When determining that the adjustment instruction is received (YES in step S103), the determiner 102 determines whether the increase or decrease rate is specified (step S104). When determining that no adjustment instruction is received (NO in step S103), the determiner 102 remains on standby.

When, for example, detecting selection of the button 302 in the window 300 in FIG. 3, the determiner 102 determines that the adjustment instruction is received, and determines whether the increase or decrease rate is specified in the field 304. When not detecting selection of the button 302 in the window 300 in FIG. 3, the determiner 102 determines that the adjustment instruction is not received and remains on standby.

When determining that the increase or decrease rate is not specified (NO in step S104), the determiner 102 advances to the processing in step S105. When determining that the increase or decrease rate is specified (YES in step S104), the determiner 102 determines whether the increase rate is specified (step S106). When determining that the increase rate is specified (YES in step S106), the determiner 102 advances to step S107. When determining that the increase rate is not specified, more specifically, the decrease rate is specified (NO in step S106), the determiner 102 advances to step S108.

For example, as illustrated in the window 300 in FIG. 3, when no increase or decrease rate is specified in the field 304, the determiner 102 determines that no increase or decrease rate is specified and performs the adjustment process in step S105. When an increase rate is specified in the field 304 as illustrated in the window 300 in FIG. 4, the determiner 102 determines that the increase rate is specified and performs the increase process in step S107. When a decrease rate is specified in the field 304, the determiner 102 determines that the decrease rate is specified and performs the decrease process in step S108.

Figure 10:
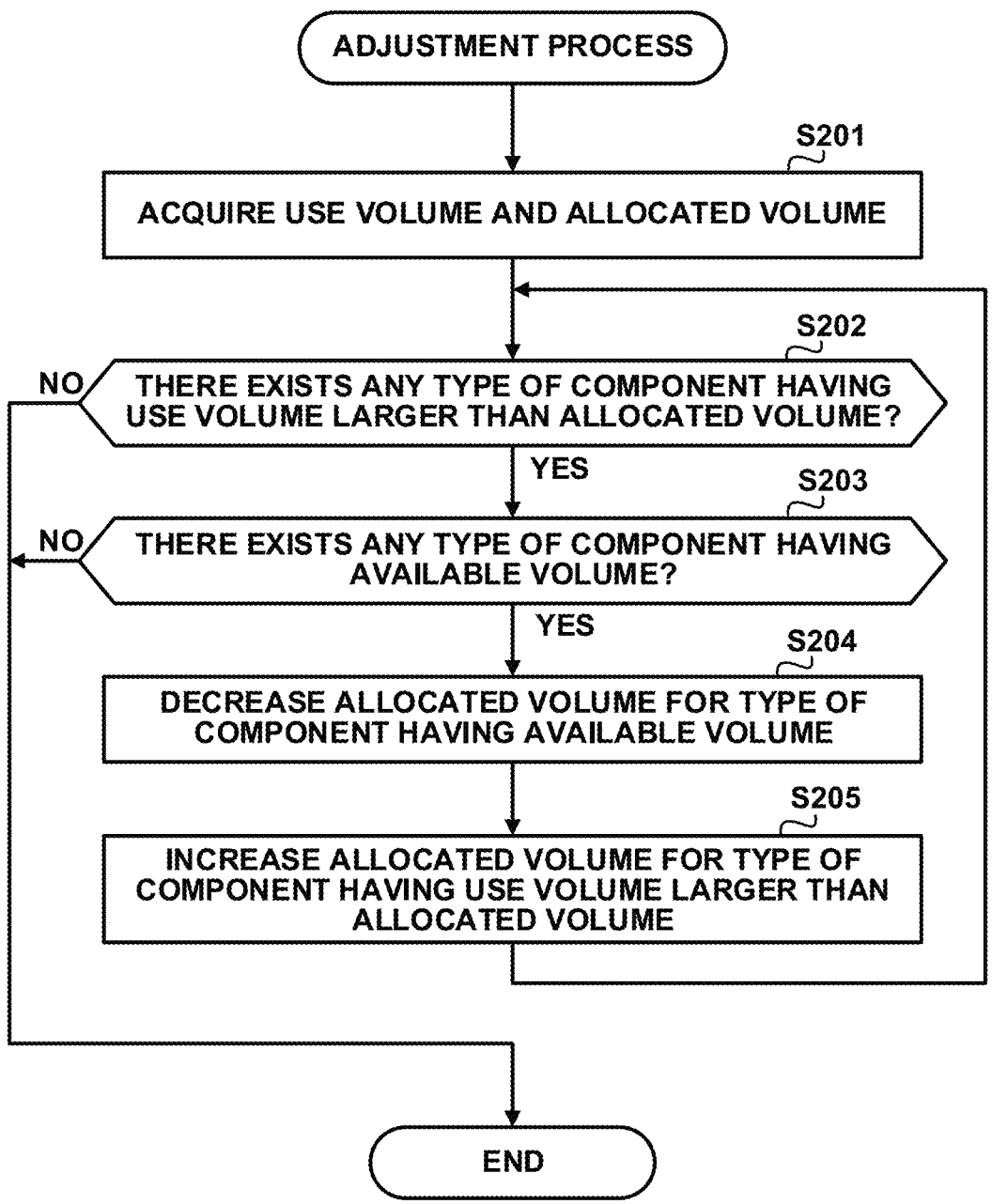
FIG. 10 is a flowchart of an adjustment process in Embodiment 1.

The adjustment process performed by the programming assisting device 100 according to the present embodiment is described with reference to the flowchart in FIG. 10.

The determiner 102 acquires the use volume calculated for each type of component and the allocated volume in the memory determined based on the range pre-allocated to each type of component (step S201).

For example, the determiner 102 acquires the use volume and the allocated volume that are calculated by the calculator 101 for each of the program, the FB, the structure, the label, and the device.

The determiner 102 determines whether there exists any type of component that has the use volume larger than the allocated volume pre-allocated (step S202). When determining that there exists a type of component that has the use volume larger than the allocated volume (YES in step S202), the determiner 102 determines whether there exists another type of component that has an available volume in the allocated volume (step S203). When determining that there is no type of component that has the use volume larger than the allocated volume (NO in step S202), the determiner 102 ends the adjustment process. When determining that there exists another type of component that has an available volume in the allocated volume (YES in step S203), the determiner 102 decreases the allocated volume for the other type of component having an available volume (step S204), and uses the decreased allocated volume to increase the allocated volume for the type of component having the use volume larger than the allocated volume (step S205). When the determiner 102 determines that there is no type of component that has the available volume in the allocated volume (NO in step S203), the adjustment process ends.

When, for example, the label has the use volume of "39K words" larger than the allocated volume of "28K words", the determiner 102 determines that there is no type of component that has the use volume larger than the allocated volume, and determines whether there exists another type of component that has an available volume in the allocated volume. When the device has the allocated volume of "35K words" and the available volume of "15K words", the determiner 102 determines that there exists a type of component that has an available volume in the allocated volume, and decreases the allocated volume for the device by "11K words" corresponding to the insufficient volume for the label. The determiner 102 then determines the allocated volume for the device to be "24K words", and determines the allocated volume for the label to be "39K words" that is increased by "11K words". When the adjustment process ends, the processing returns to step S109 in FIG. 9.

Figure 11:
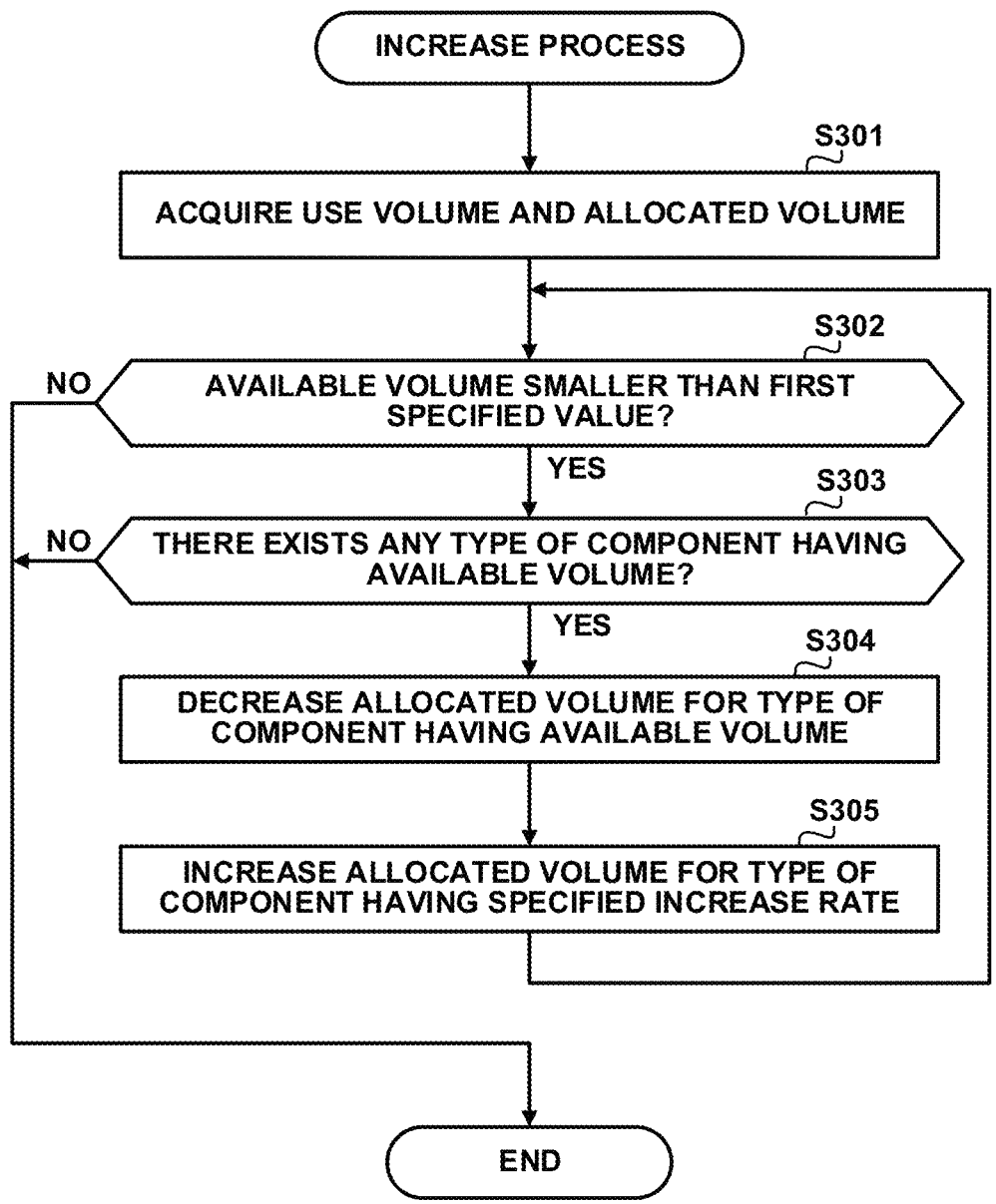
FIG. 11 is a flowchart of an increase process in Embodiment 1.

The increase process performed by the programming assisting device 100 according to the present embodiment is now described with reference to the flowchart in FIG. 11. The processing in step S301 is the same as in step S201 in FIG. 10 and is thus described from step S302.

The determiner 102 determines whether the available volume for the type of component having the specified increase rate is smaller than the first specified value (step S302). When determining that the available volume for the type of component having the specified increase rate is smaller than the first specified value (YES in step S302), the determiner 102 determines whether there exists another type of component that has an available volume (step S303). When determining that the available volume for the type of component having the specified increase rate is larger than or equal to the first specified value (NO in step S302), the determiner 102 ends the increase process. When determining that there exists another type of component that has an available volume (YES in step S303), the determiner 102 decreases the allocated volume for the other type of component (step S304), and uses the decreased allocated volume to increase the allocated volume for the type of component having the specified increase rate (step S305). The processing then returns to step S302. When determining that there is no type of component that has the available volume (NO in step S303), the determiner 102 ends the increase process.

When, for example, the current available volume for the label is "21%" and thus is not sufficient for the first specified value of "41%" obtainable by adding the increase rate of "20%", the determiner 102 determines whether there exists another type of component that has an available volume. When determining that there is a device as the type of component that has an available volume, the determiner 102 decreases the available volume in the allocated volume for the device by an amount sufficient to increase the available volume for the label by the increase rate of "20%", and uses the decreased allocated volume to increase the allocated volume for the label. The determiner 102 then returns to step S302 to determine whether the increased available volume for the label satisfies the first specified value. When determining that the increased available volume satisfies the first specified value, the determiner 102 ends the increase process. When determining that the increased available volume for the label does not satisfy the first specified value, for example, when the device does not have the available volume sufficient to increase the available volume for the label by the increase rate of "20%", the determiner 102 determines whether there exists another type of component other than the device has an available volume. When there exists another type of component other than the device has an available volume, the determiner 102 decreases the available volume for the other type of component by the necessary amount and adds the decreased available volume to the allocated volume for the label. As described above, the processing is repeated until the available volume for the label reaches the first specified value or greater.

Figure 12:
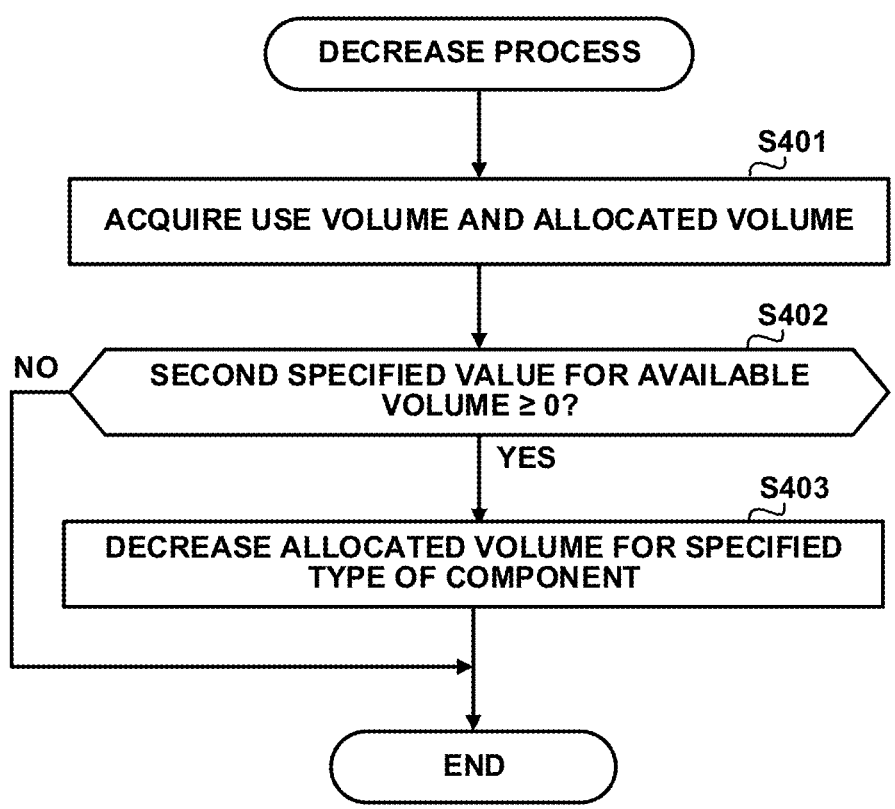
FIG. 12 is a flowchart of a decrease process in Embodiment 1.

The decrease process performed by the programming assisting device 100 according to the present embodiment is now described with reference to the flowchart in FIG. 12. The processing in step S401 is the same as in step S201 in FIG. 10 and is thus described from step S402.

The determiner 102 determines whether the second specified value for the available volume for the type of component having the specified decrease rate is larger than or equal to zero (step S402). When determining that the second specified value for the available volume for the type of component having the specified decrease rate is larger than or equal to zero (YES in step S402), the determiner 102 decreases the allocated volume for the type of component having the specified decrease rate by the specified decrease rate (step S403). When determining that the second specified value for the available volume for the type of component having the specified decrease rate is smaller than zero (NO in step S402), the determiner 102 ends the decrease process.

When, for example, the current available volume for the label is "21%" and the decrease rate is "20%", the second specified value is "1%", and thus, the determiner 102 decreases the allocated volume for the "label" as the type of component to cause the available volume to reach "1%". When the decrease rate is "30%", the second specified value is less than zero, and thus, the determiner 102 ends the decrease process.

When the adjustment process (step S105), the increase process (step S107), or the decrease process (step S108) ends, the changer 103 changes, based on the allocated volume determined by the determiner 102 for each type of component, the range pre-allocated to each type of component relating to the information indicating the address space stored in the project database 200 (step S109). The display 104 then displays the determined allocated volume on the screen (step S110).

For example, the changer 103 changes the range of the address space for the "label" and the range of the address space for the "device", each stored in the project database 200, based on the allocated volume of "39K words" for the "label" and the allocated volume of "24K words" for the "device", each determined by the determiner 102. As illustrated in FIG. 5, the display 104 displays the value 306 indicating the allocated volume determined by the determiner 102 for the "label", and updates the bar graph 307 based on the allocated volume determined by the determiner 102.

Figure 13:
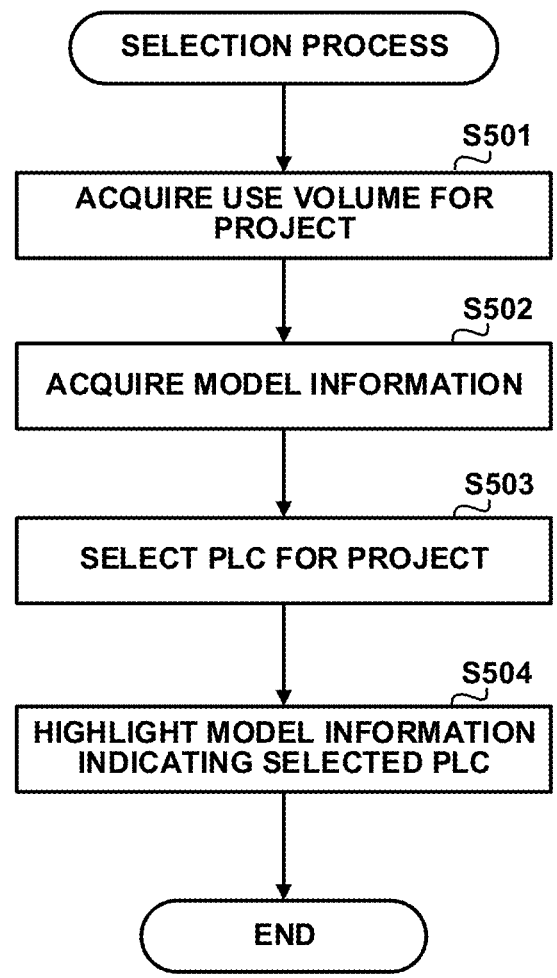
FIG. 13 is a flowchart of a selection process in Embodiment 1.

The selection process performed by the programming assisting device 100 according to the present embodiment is now described with reference to the flowchart in FIG. 13.

The selector 105 acquires the use volume used by the project (step S501). The selector 105 also acquires the model information 110 (step S502). The selector 105 then selects the model name of the PLC appropriate for performing the project (step S503). The display 104 highlights the model information including the selected model name on the screen (step S504).

When, for example, the button 303 is selected in the window 300 in FIG. 3, the selector 105 acquires the use volume in the memory for the project X calculated by the calculator 101. The selector 105 also acquires the model information 110 from the auxiliary storage 13. The selector 105 then compares the use volume in the memory for the project X with the model information 110 to select the model name of the PLC appropriate for performing the project X. As illustrated in the window 400 in FIG. 8, the display 104 displays the table 405 on the screen and highlights the model information including the model names (first to third rows) selected by the selector 105.

The structure according to the present embodiment can determine the use volume in the memory for each type of component included in the project created by the user to be performed by the PLC, and can automatically change the allocated volume pre-allocated to each type of component when the determined use volume for each type of component is larger than the allocated volume. This reduces the number of work-hours for the user in creating the project.

The structure according to the present embodiment can also identify the use volume and the available volume for each type of component included in the project. This allows easier determination of the degree by which the project is expandable in diversion development of the project.

The structure according to the present embodiment can identify the use volume for the component included in the project and further identify the accessory information about the component. This allows easier determination about adding a component to the project or eliminating a component from the project.

The structure according to the present embodiment can select a PLC appropriate for performing the project based on the use volume in the memory for the project, more specifically, the memory volume necessary for the project. This allows pre-generation of projects when the system is scaled up, thus saving the time for the user in collecting information required for selecting the model of the PLC.

Embodiment 2

A programming assisting device 100 according to Embodiment 2 uses an inference result based on a trained model to select model information including the model name of a PLC appropriate for performing a project.

Figure 14:
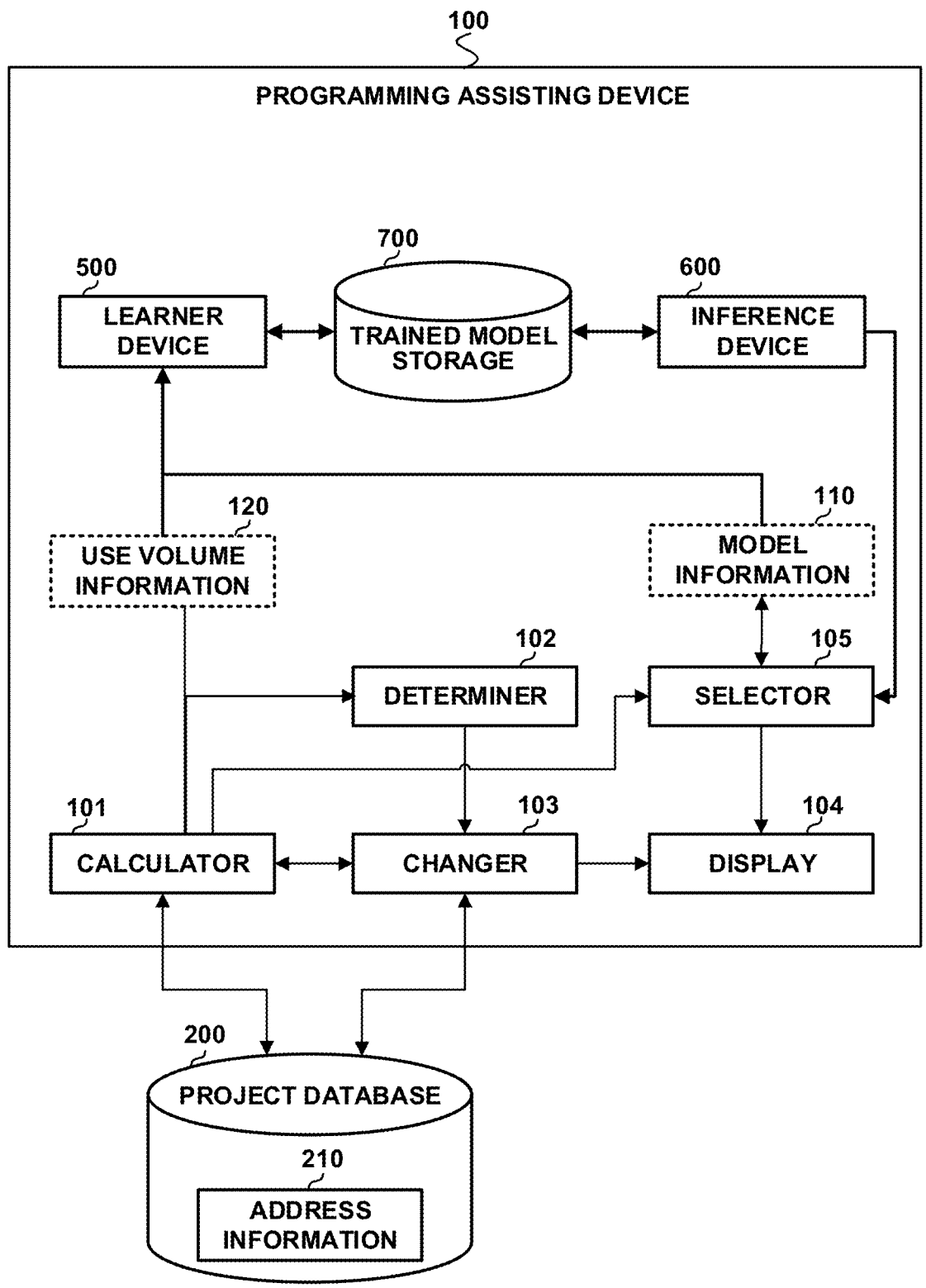
FIG. 14 is a diagram of a programming assisting device according to Embodiment 2, illustrating the functional components.

As illustrated in FIG. 14, the programming assisting device 100 according to Embodiment 2 includes a learner device 500, an inference device 600, and a trained model storage 700.

In the programming assisting device 100 according to Embodiment 2, the selector 105 determines that the PLC having the model name included in the model information inferred by, using a trained model generated by the learner device 500, the inference device 600 is appropriate for performing the project.

Figure 15:
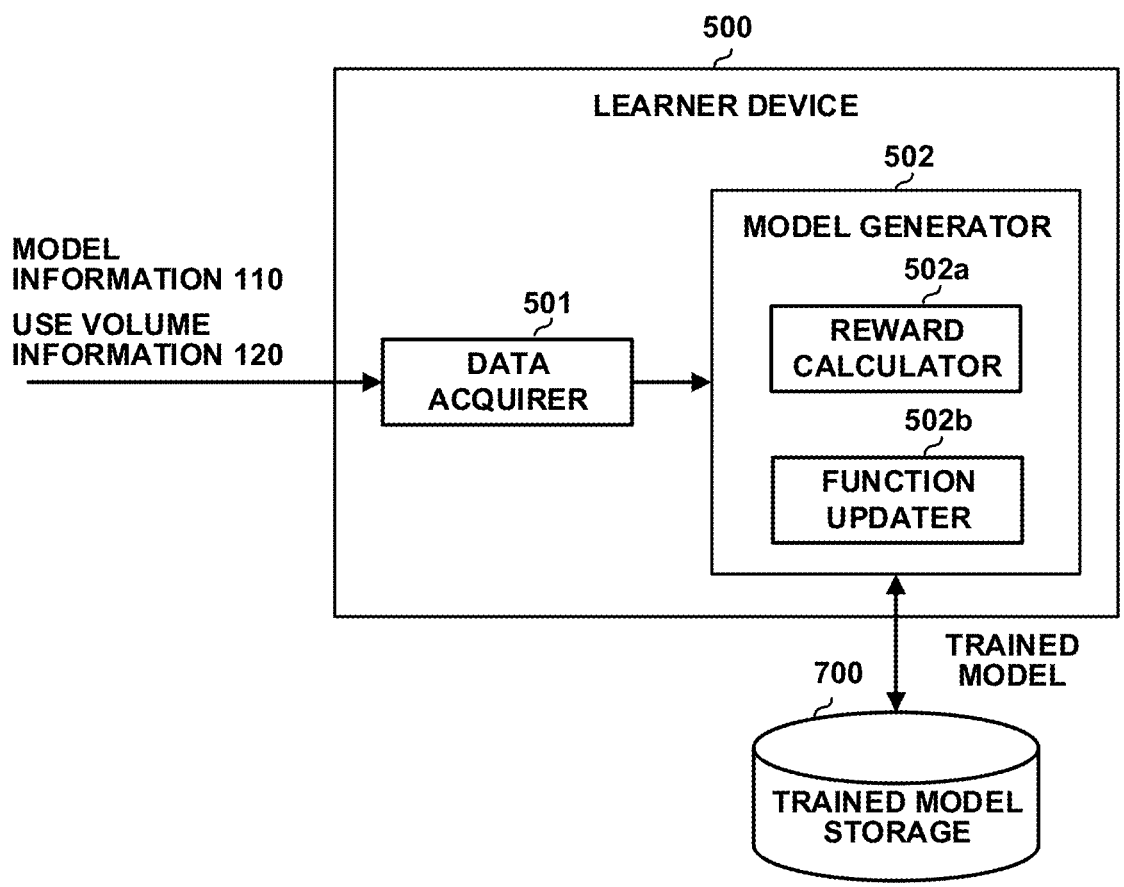
FIG. 15 is a diagram of a learner device in Embodiment 2, illustrating the functional components.

FIG. 15 is a diagram of the learner device 500, illustrating the functional components. The learner device 500 includes a data acquirer 501 and a model generator 502.

The data acquirer 501 acquires training data including use volume information 120 indicating the use volume calculated by the calculator 101 for the project and the model information 110 including the model name selected by the selector 105. The data acquirer 501 is implemented by the processor 11. The data acquirer 501 is an example of second data acquiring means.

When the use volume for the project is calculated by the calculator 101, the use volume information 120 is stored into the auxiliary storage 13 in a manner associated with information identifying the project. When the selector 105 performs the selection process, the model information 110 including the model name selected for the project, for which the use volume is calculated, is stored into the auxiliary storage 13 in a manner associated with the information identifying the project for which the use volume is calculated.

The data acquirer 501 acquires, from the auxiliary storage 13, the use volume information 120 and the model information 110, each stored in a manner associated with the information identifying the project, as the training data.

The model generator 502 learns, based on the training data that includes the model information 110 including the selected model name as well as the use volume information 120, the model information including the model name to be selected. More specifically, the model generator 203 generates a trained model for inferring, based on the use volume used by the project, the model information 110 including the model name to be selected. The model generator 502 is implemented by the processor 11. The model generator 502 is an example of model generation means.

The model generator 502 may use a known learning algorithm such as supervised learning, unsupervised learning, or reinforcement learning. In the example described below, reinforcement learning is used. In reinforcement learning, an agent (action performer) in an environment observes a current state (parameters in the environment) and determines an action to perform. The action of the agent dynamically changes the environment, and the agent receives a reward based on the changes in the environment. The agent repeats the process and learns an action policy that maximizes rewards to be acquired over the series of actions. Q-learning and temporal difference (TD) learning are known as typical reinforcement learning methods. In Q-learning, for example, a general update expression for an action value function Q(s, a) is indicated with Expression 1.

$$Q(s_t, a_t) \leftarrow Q(s_t, a_t) + \alpha \left( r_{t+1} + \gamma \max_a Q(s_{t+1}, a) - Q(s_t, a_t) \right)$$ Expression 1

In Expression 1, $s_t$ indicates a state of environment at time t, and $a_t$ indicates an action at time t. The state changes to $s_{t+1}$ by the action $a_t$. A reward acquired depending on any change of the state is $r_{n+1}$, $\gamma$ is a discount factor with a range of $0<\gamma\leq1$, and $\alpha$ is a learning coefficient with a range of $0<\alpha\leq1$. The model information is the action $a_t$ and the use volume information is the state $s_t$. The agent learns an optimal action $a_t$ in the state $s_t$ at time t.

The update expression indicated with Expression 1 yields a greater action value Q when an action value Q of an action a having the greatest Q-value at time t+1 is greater than an action value Q of the action a performed at time t and yields a less action value Q when the action value Q at time t+1 is less than the action value Q performed at time t. In other words, the action value function Q(s, a) is updated to approximate the action value Q of the action a at time t to the optimal action value at time t+1. Thus, an optimal action value in an environment affects an action value in an earlier stage of the environment in a sequential manner.

To generate a trained model by reinforcement learning as described above, the model generator 502 includes a reward calculator 502a and a function updater 502b.

The reward calculator 502a calculates a reward based on the model information 110 including the selected model name and the use volume information 120. The reward calculator 502a calculates a reward r based on the validity of the model information 110 including the selected model name. The validity of the model information 110 including the selected model name is determined based on, for example, whether the PLCs having the model names included in the highlighted model information 110 is determined by the user to be appropriate for performing the project. When, for example, the window 400 in FIG. 8 is displayed, the programming assisting device 100 requests the user to select, from the PLCs having the model names included in the model information displayed on the table 405, a PLC appropriate for performing the project X, and receives the selection by the user. When the selection rate of the model name selected by the user from the model names included in the highlighted model information is greater, the validity of the model information 110 including the selected model name is higher. For example, as illustrated in the window 400 in FIG. 8, when the highlighted model information includes three model names, and when the number of times a model name is selected from these three model names by the user as appropriate for performing the project X is greater, the selection rate is higher. When the validity of the model information 110 is higher, the reward r is increased (for example, a reward of 1 is provided). When the validity of the model information 110 is lower, the reward r is decreased (for example, a reward of −1 is provided).

The function updater 502b updates, based on the reward calculated by the reward calculator 502a, a function for determining the model information including the model name selected by the selector 105, and outputs the function to the trained model storage 700. In Q-learning, for example, the action value function $Q(s_t, a_t)$ indicated with Expression 1 is used as a function for determining the model information including the model name selected by the selector 105.

The learning process described above is performed repeatedly. The trained model storage 700 stores the action value function $Q(s_t, a_t)$ updated by the function updater 502b, more specifically, stores the trained model.

Figure 16:
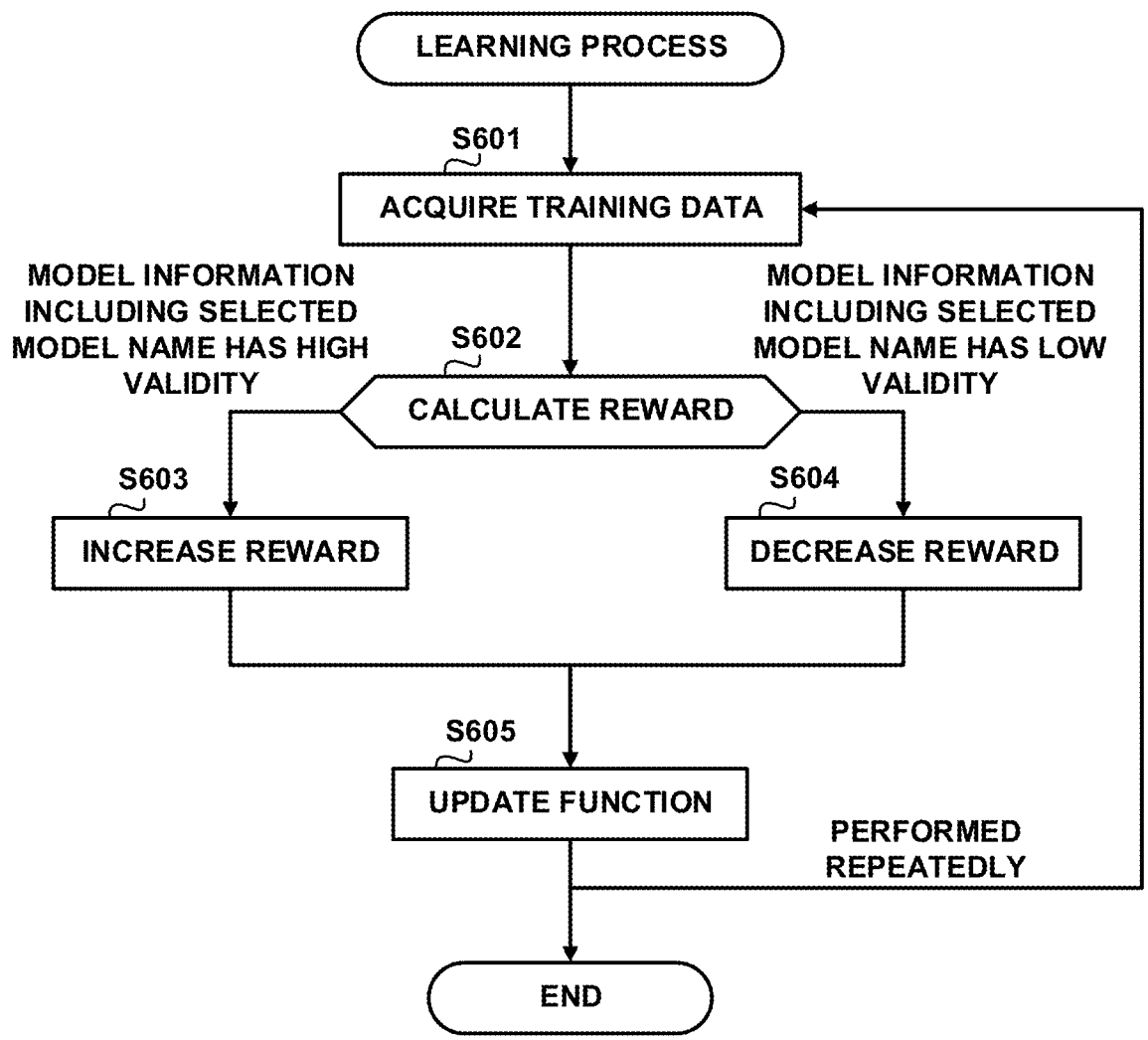
FIG. 16 is a flowchart of a learning process performed by the learner device in Embodiment 2.

A learning process performed by the learner device 500 is now described with reference to FIG. 16. FIG. 16 is a flowchart of the learning process performed by the learner device 500.

The data acquirer 501 acquires, as the training data, the model information 110 including the selected model name and the use volume information 120 (step S601).

The model generator 502 calculates the reward based on the model information 110 including the selected model name and the use volume information 120 (step S602). More specifically, the reward calculator 502a acquires the model information 110 including the selected model name and the use volume information 120, and determines whether to increase the reward (step S603) or decrease the reward (step S604) based on the validity of the model information 110 including the selected model name.

When determining to increase the reward, the reward calculator 502a increases the reward in step S603. When determining to decrease the reward, the reward calculator 502a decreases the reward in step S604.

The function updater 502b updates, based on the reward calculated by the reward calculator 502a, the action value function $Q(s_t, a_t)$ indicated with Expression 1 stored in the trained model storage 700 (step S605).

The learner device 500 repeats steps S601 to S605 as described above, and the trained model storage 700 stores the generated action value function $Q(s_t, a_t)$ as the trained model.

Figure 17:
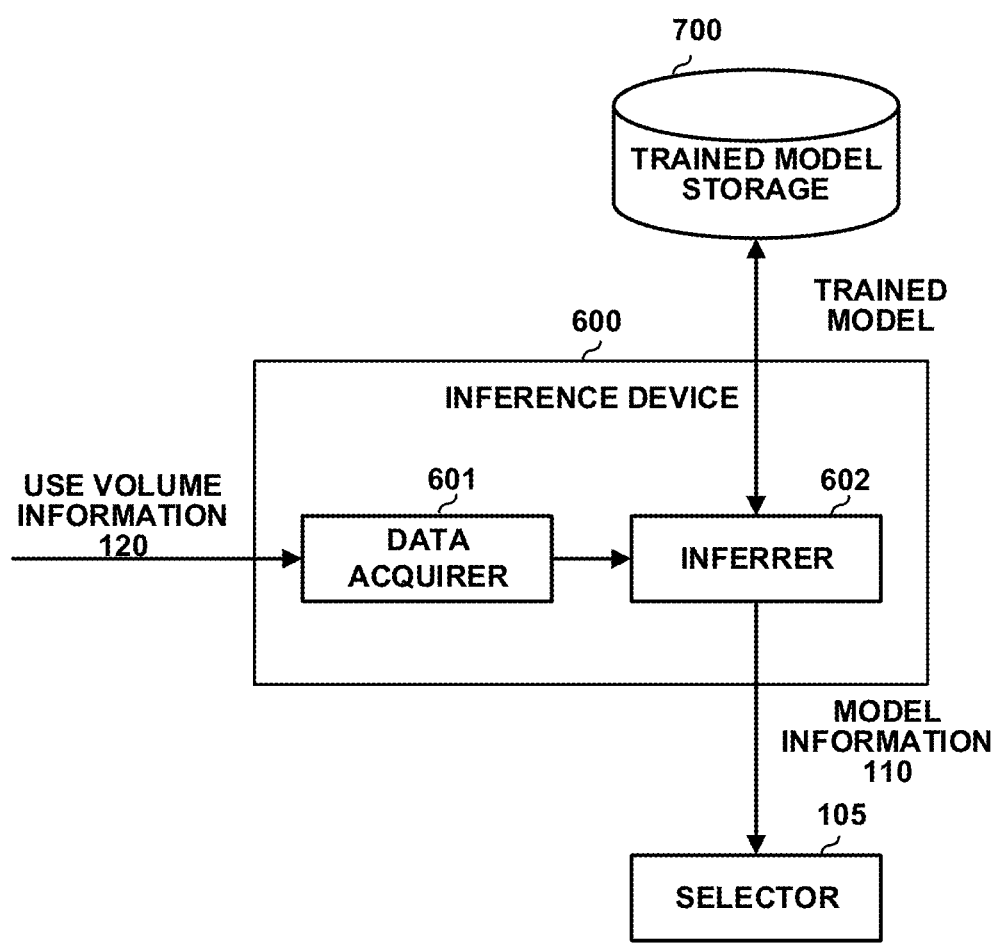
FIG. 17 is a diagram of an inference device in Embodiment 2, illustrating the functional components.

FIG. 17 is a diagram of the inference device 600, illustrating the functional components. The inference device 600 includes a data acquirer 601 and an inferrer 602.

The data acquirer 601 acquires the use volume information 120 indicating the use volume for the project. The data acquirer 601 is implemented by the processor 11. The data acquirer 601 is an example of first data acquiring means.

The inferrer 602 infers, using the trained model, the model information about the PLC for performing the project. More specifically, the use volume information 120 acquired by the data acquirer 601 is input into the trained model to infer the model information 110 about the PLC appropriate for performing the project that requires the use volume indicated by the use volume information 120. The inferrer 602 is implemented by the processor 11. The inferrer 602 is an example of inference means.

A process performed by the inference device 600 to acquire the model information 110 is now described with reference to FIG. 18. FIG. 18 is a flowchart of an inference process performed by the programming assisting device 100.

The data acquirer 601 acquires the use volume information 120 (step S701).

The inferrer 602 inputs the use volume information 120 into the trained model stored in the trained model storage 700 to acquire the model information 110 (step S702).

The inferrer 602 outputs the acquired model information 110 to the selector 105 (step S703).

The selector 105 highlights the output model information 110 on the screen (step S704).

The structure according to the present embodiment can automatically determine the model information about the PLC appropriate for performing the project created by the user through the learning process and the inference process. This saves the time in collecting the information used for selecting the model, and further allows highly reliable selection of the model.

Modifications

Although the embodiments of the present disclosure have been described above, the embodiments of the present disclosure may be modified or applied in various manners to implement the present disclosure.

In Embodiment 1, the bar graph 307 indicates the rates but may indicate actual measurements.

In Embodiment 1 described above, a method for increasing or decreasing the allocated volume for each type of component is described, but the method is not limited thereto. When, for example, multiple types of components have available volumes, the allocated volume may be decreased, in a sequential order from the type of component having the largest available volume, by a fixed value of, for example, 5K words, and the decreased allocated volume may be used to increase the allocated volume for the type of component having the use volume larger than the allocated volume. When, for the type of component having the use volume larger than the allocated volume, the increased allocated volume reaches the use volume, the adjustment process for increasing or decreasing the allocated volume ends. The available volume may be decreased by a specific ratio of, for example, 5%, instead of the fixed value. The available volume may also be decreased in a priority order of types of components predetermined by the user.

In Embodiment 2 described above, the programming assisting device 100 includes the learner device 500, the inference device 600, and the trained model storage 700. However, the learner device 500, the inference device 600, and the trained model storage 700 may be devices external to the programming assisting device 100. The learner device 500, the inference device 600, and the trained model storage 700 may be located in a cloud server. The learner device 500 and the inference device 600 may be included in a single device. The learner device 500, the inference device 600, and the trained model storage 700 may be included in a single device.

In Embodiment 2 described above, the learning algorithm used by the inferrer 602 is reinforcement learning. In some embodiments, the inferrer 602 may use other algorithms. As learning algorithms, other than reinforcement learning, supervised learning, unsupervised learning, and semi-supervised learning may also be applied.

In Embodiment 2 described above, the model generator 502 may use, as a learning algorithm, deep learning for learning extraction of feature quantities themselves, or may perform machine learning in other known methods such as a neural network, inductive logic programming, or a support vector machine.

The model generator 502 may also use the training data acquired from multiple programming assisting devices 100 to learn the model information 110 including the to-be-selected model name that is to be selected. The model generator 502 may acquire the training data from multiple programming assisting devices 100 used in the same area, or may use the training data collected from multiple programming assisting devices 100 operating individually in different areas to learn the model information 110 including the to-be-selected model name. The programming assisting devices 100, from which the training data is collected, can be added or eliminated during the processes. Further, the learner device 500 that has learned the model information 110 including the to-be-selected model name for a programming assisting device 100 may be applied to another programming assisting device 100, and may be updated by relearning the model information 110 including the to-be-selected model name for the other programming assisting device 100.

An operation program describing the operation of the programming assisting device 100 according to the above embodiments may be used for an existing personal computer or information terminal device to cause the personal computer or the information terminal device to function as the programming assisting device 100 according to the embodiments.

The above program may be distributed with any method. For example, the program may be stored in a non-transitory computer-readable recording medium such as a compact disc read-only memory (CD-ROM), a digital versatile disc (DVD), or a memory card for distribution or may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique according to one or more embodiments of the present disclosure can provide a programming assisting program, a programming assisting device, and a programming assisting method capable of automatically changing an allocated volume in a memory for each type of component included in a project performed by a PLC.

REFERENCE SIGNS LIST

11 Processor
12 Main storage
13 Auxiliary storage
14 Communicator
15 Input device
16 Output device
17 Bus
100 Programming assisting device
101 Calculator
102 Determiner
103 Changer
104 Display
105 Selector
110 Model information
120 Use volume information
200 Project database
210 Address information
300, 400 Window
301, 304 Field
302, 303 Button
305, 306, 310 Value
307, 311 Bar graph
308, 405 Table
309 Device name
312 Lower limit indicator
313 Upper limit indicator
314 Pointer
315 Graduation line
316 Accessory information
317 Scroll bar
318 Slider
401 Use volume
402 Model name
403 Memory volume
404 Information
500 Learner device
501, 601 Data acquirer
502 Model generator
502a Reward calculator
502b Function updater
600 Inference device
602 Inferrer
700 Trained model storage

The invention claimed is:

1. A non-transitory computer-readable recording medium storing a programming assisting program, the programming assisting program causing a computer to execute a method, the method comprising:

acquiring, from a database storing information indicating an address space in a memory of a programmable logic controller having a range pre-allocated to each type of component included in a project performed by the programmable logic controller, the information indicating the address space;

allocating components included in the project to the address space indicated by the acquired information to calculate a use volume in the memory used by the project for said each type of component and calculate a pre-allocated volume in the memory based on the range pre-allocated to said each type of component in the address space indicated by the acquired information;

determining, based on the use volume calculated for said each type of component and the pre-allocated volume calculated based on the range pre-allocated to said each type of component, an allocated volume in the memory allocated to said each type of component included in the project;

changing, based on the determined allocated volume for said each type of component, the range pre-allocated to said each type of component in the address space stored in the database including one of (i) increasing the range pre-allocated to a first of said each type of component by a first amount and decreasing the range pre-allocated to a second of said each type of component by a second amount that corresponds to the first amount or (ii) decreasing the range pre-allocated to the first of said each type of component by the first amount and increasing the range pre-allocated to the second of said each type of component by the second amount that corresponds to the first amount; and displaying, for said each type of component, the calculated use volume and the determined allocated volume on a screen.

2. The non-transitory computer-readable recording medium according to claim 1, the method further comprising displaying the use volume in the memory used by the components included in the project.

3. The non-transitory computer-readable recording medium according to claim 1, the method further comprising displaying accessory information describing the components included in the project.

4. The non-transitory computer-readable recording medium according to claim 1, the method further comprising:

selecting, based on the calculated use volume and model information including model names of programmable logic controllers and memory volumes of the programmable logic controllers in a manner associated with each other, a model name of one of the programmable logic controllers able to perform the project for which the use volume has been calculated, and highlighting the model information including the selected model name.

5. The non-transitory computer-readable recording medium according to claim 4, the method further comprising:

acquiring use volume information indicating the calculated use volume for the project, inferring, using a trained model trained to infer the model information including the model name of the one of the programmable logic controllers able to perform the project from the acquired use volume information indicating the use volume for the project, the model information including the model name of the one of the programmable logic controllers able to perform the project from the acquired use volume information, and highlighting the inferred model information.

6. The non-transitory computer-readable recording medium according to claim 5, the method further comprising:

acquiring training data including the use volume information indicating the calculated use volume for the project and the model information including the selected model name, and generating the trained model based on the training data.

7. A programming assisting device, comprising:
a storage; and
processing circuitry to acquire, from a database storing information indicating an address space in a memory of a programmable logic controller having a range pre-allocated to each type of component included in a project performed by the programmable logic controller, the information indicating the address space, allocate components included in the project to the address space indicated by the acquired information to calculate a use volume in the memory used by the project for said each type of component and calculate a pre-allocated volume in the memory based on the range pre-allocated to said each type of component in the address space indicated by the acquired information, determine, based on the use volume calculated for said each type of component and the pre-allocated volume calculated based on the range pre-allocated to said each type of component, an allocated volume in the memory allocated to said each type of component included in the project, change, based on the determined allocated volume for said each type of component, the range pre-allocated to said each type of component in the address space stored in the database including one of (i) increasing the range pre-allocated to a first of said each type of component by a first amount and decreasing the range pre-allocated to a second of said each type of component by a second amount that corresponds to the first amount or (ii) decreasing the range pre-allocated to the first of said each type of component by the first amount and increasing the range pre-allocated to the second of said each type of component by the second amount that corresponds to the first amount, and display, for said each type of component, the calculated use volume and the determined allocated volume on a screen.

8. A programming assisting method, comprising:

acquiring, from a database storing information indicating an address space in a memory of a programmable logic controller having a range pre-allocated to each type of component included in a project performed by the programmable logic controller, the information indicating the address space;

allocating components included in the project to the address space indicated by the acquired information to calculate a use volume in the memory used by the project for said each type of component and calculate a pre-allocated volume in the memory based on the range pre-allocated to said each type of component in the address space indicated by the acquired information;

determining, based on the use volume calculated for said each type of component and the pre-allocated volume calculated based on the range pre-allocated to said each type of component, an allocated volume in the memory allocated to said each type of component included in the project;

changing, based on the determined allocated volume for said each type of component, the range pre-allocated to said each type of component in the address space stored in the database including one of (i) increasing the range pre-allocated to a first of said each type of component by a first amount and decreasing the range pre-allocated to a second of said each type of component by a second amount that corresponds to the first amount or (ii) decreasing the range pre-allocated to the first of said each type of component by the first amount and increasing the range pre-allocated to the second of said each type of component by the second amount that corresponds to the first amount; and displaying, for said each type of component, the calculated use volume and the determined allocated volume on a screen.

9. The non-transitory computer-readable recording medium according to claim 2, the method further comprising displaying accessory information describing the components included in the project.

10. The non-transitory computer-readable recording medium according to claim 2, the method further comprising:

selecting, based on the calculated use volume and model information including model names of programmable logic controllers and memory volumes of the programmable logic controllers in a manner associated with each other, a model name of one of the programmable logic controllers able to perform the project for which the use volume has been calculated, and highlighting the model information including the selected model name.

11. The non-transitory computer-readable recording medium according to claim 1, the method further comprising:

receiving a user-specified increase rate for the increasing the allocated volume for the first of said each type of component; and increasing the allocated volume for the first of said each type of component based on the increase rate by using available volume from the second of said each type of component.

12. The non-transitory computer-readable recording medium according to claim 1, the method further comprising:

receiving a user-specified decrease rate for the decreasing the allocated volume for the first of said each type of component; and decreasing the allocated volume for the first of said each type of component based on the decrease rate.

13. The non-transitory computer-readable recording medium according to claim 1, the method further comprising:

receiving a user-specified increase rate for the allocated volume of the first of said each type of component;

calculating a specified value as a sum of a rate of an available volume to the allocated volume for the first of said each type of component and the user-specified increase rate; and increasing the allocated volume for the first of said each type of component by redistributing available volume from the second of said each type of component until the available volume for the first of said each type of component is greater than or equal to the specified value.

14. The non-transitory computer-readable recording medium according to claim 1, the method further comprising:

receiving a user-specified decrease rate for the allocated volume of the first of said each type of component;

calculating a specified value as a difference between a rate of an available volume to the allocated volume for the first of said each type of component and the user-specified decrease rate; and decreasing the allocated volume for the first of said each type of component when the specified value is greater than or equal to zero, and increasing the allocated volume for the second of said each type of component using the decreased allocated volume.

\* \* \* \* \*